(12) United States Patent
Diep

(10) Patent No.: US 11,993,206 B1
(45) Date of Patent: May 28, 2024

(54) DRIVER COURTESY

(71) Applicant: Minh Quang Diep, Port Saint Lucie, FL (US)

(72) Inventor: Minh Quang Diep, Port Saint Lucie, FL (US)

(*) Notice: Subject to any disclaimer, the term of this patent is extended or adjusted under 35 U.S.C. 154(b) by 0 days.

(21) Appl. No.: 17/879,486

(22) Filed: Aug. 2, 2022

(51) Int. Cl.
*B60Q 7/00* (2006.01)
*B60Q 1/50* (2006.01)

(52) U.S. Cl.
CPC .............. *B60Q 7/00* (2013.01); *B60Q 1/5035* (2022.05)

(58) Field of Classification Search
CPC .................................. B60Q 7/00; B60Q 1/5035
See application file for complete search history.

(56) References Cited

U.S. PATENT DOCUMENTS

| 6,553,285 B1 | 4/2003 | Bahmad | |
|---|---|---|---|
| 8,063,998 B2 | 11/2011 | Smith | |
| 2002/0164962 A1* | 11/2002 | Mankins | G08G 1/127 |
| | | | 455/99 |

\* cited by examiner

*Primary Examiner* — Daryl C Pope
(74) *Attorney, Agent, or Firm* — Origins Law, LLC; Nicholas Spatola

(57) ABSTRACT

A driver curtesy including a frame which stores an electronic system and an electric system allowing to display a message to other vehicles. The frame consists of a front and back portion wherein the front portion is configured to be exposed to the outside of a vehicle and the back portion is configured to be attached to the exterior surface of the vehicle by an attachment adapter. The electronic system allows a display to show emergencies, informative and preventive messages when activating the frame by the electric system which provides power to the frame when displaying the messages. The frame can be customized to any shape and include an attachment which can be adapted thereof capable of being attached to any vehicle or trailer.

1 Claim, 4 Drawing Sheets

DRIVER COURTESY

BACKGROUND OF THE INVENTION

1. Field of the Invention

The present invention relates to a driver courtesy and, more particularly, to a driver courtesy that can display messages by wireless connection to an external remote device controlled by voice.

2. Description of the Related Art

Several designs for a display system for vehicles have been designed in the past. None of them, however, include a detachable device to display messages in the external sides of a vehicle to deliver any message to other motorist in the vicinity when required by a wireless connection with an external device.

Applicant believes that a related reference corresponds to U.S. Pat. No. 8,063,998 issued for a system and method for displaying information on vehicles such as tractor trailers using monitors which are mounted on the vehicle. Applicant believes that another related reference corresponds to U.S. Pat. No. 6,553,285 issued for a message conveying system for motor vehicles that has a control panel with a button which are used to activate different messages on a display device. None of these references, however, teach of a mobile messaging system for use with motor vehicles such as tractor trailers that is comprised of a set of display messages that have been wirelessly transmitted by a remote device using a voice to text application allowing messages to be displayed to other motorist in the vicinity.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a driver courtesy that can operate by wireless connection.

It is another object of this invention to provide a driver courtesy that can be weatherproof and waterproof.

It is still another object of the present invention to provide a driver courtesy that displays signal messages to other motorist in the vicinity.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
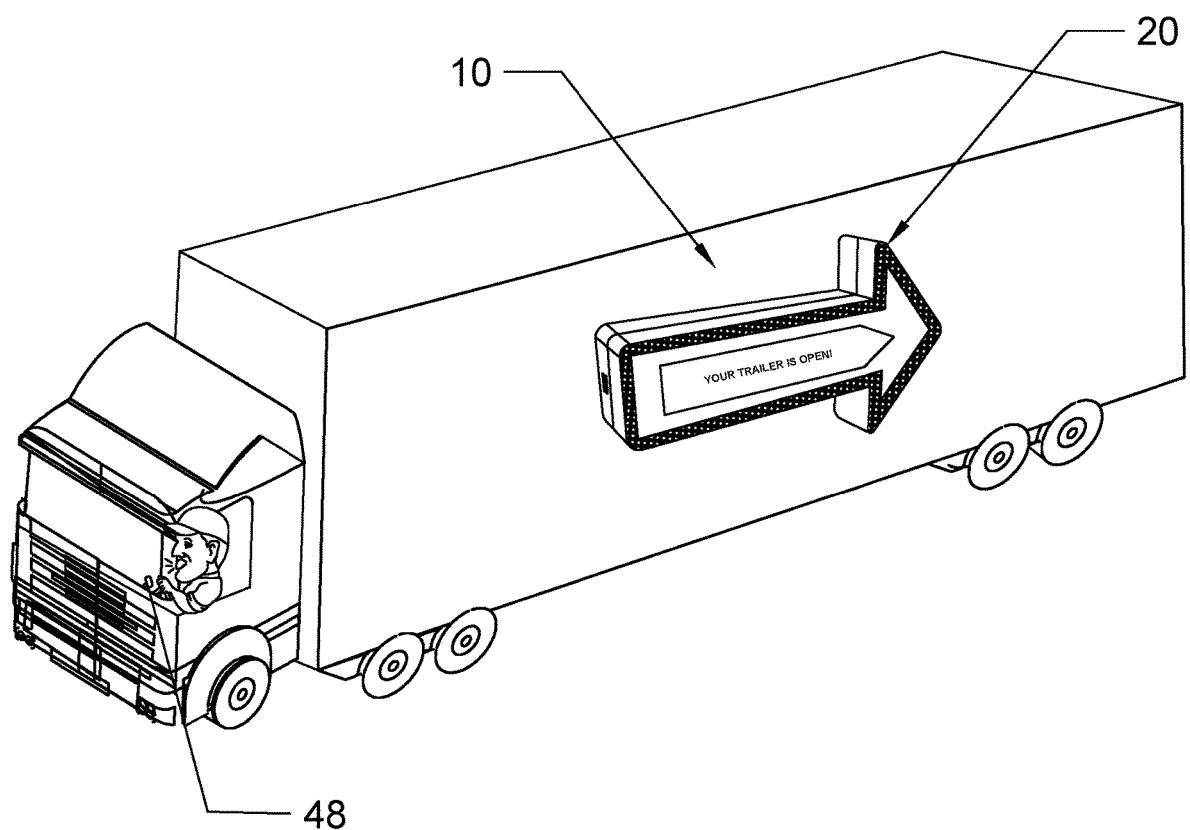
FIG. 1 represents an operational view of the present invention 10.

Referring now to the drawings, where the present invention is generally referred to with numeral 10, it can be observed that it basically includes a frame assembly 20, an electronic system assembly 40 and an electric assembly 60.

The frame assembly 20 includes a frame 22 a front portion 23, a back portion 24 an attaching portion 25, an attachment adapter 26 and a trailer/vehicle 29. The frame 22 may be suitable to be made of an aluminum material with natural rubber allowing a waterproof frame when raining. Nevertheless, in other embodiment, the frame 22 may be made of a steel, carbon fiber, or any other variation. It is to be considered that the frame 22 may be located to a lateral side of the trailer/vehicle 29 allowing to provide a vision for the other vehicles when driving trailer/vehicle 29. In a preferred embodiment, the frame 22 may have an arrow shape as best observed in FIG. 1, Nevertheless, it is to be considered that any other shapes including geometrical shapes like square shapes, triangle shapes and circle shapes may be suitable for frame 22 also considering any derived shape thereof. It may be considered that a user may customize the shape of the frame 22 as required. It is to be considered that frame 22 may be assembled by the front portion 23 and the back portion 24 which may have a hollow body that store the electronic system assembly 40 and the electric system assembly 60. It is to be understood that the front portion 23 and the back portion 24 may be made of a material from which the frame 22 may be made of. The front portion 23 and the back portion 24 may be interlocked by each side thereof as best observed in FIG. 2.

In a suitable embodiment, the front portion 23 may have the electronic system assembly 40 attached to the surface thereof to allow the frame display messages. As best observed in FIG. 2 and FIG. 3 the front portion 23 and the back portion 24 may have an arrow body to conform with the body of the frame assembly 22. As observed in FIG. 4 the frame 22 may include the attachment adapter 26 which is placed in a rear portion thereof considering the back portion 24. In a suitable embodiment, the attachment adapter 26 may be in a rear central portion of the frame 22 to provide stability when attaching to the side of the trailer/vehicle 29. In one embodiment, the attachment adapter 26 may have a rectangular body that allows inserting any type of screws to lock the frame 22 in a side of the trailer/vehicle 29. It may be considered that the attachment adapter 26 may be configured to allow the frame 22 to be attached to any commercial trailer, movie trailer, fuel trailer, vehicle, bus or any other variation thereof considering passing through highways or street where the frame 22 can be seen by other motorist in the vicinity. The attachment adapter 26 may be suitable to be made of a steel material to provide resistance when collocating the frame 22 in a surface of a vehicle. In another embodiment, the frame 22 may include a plurality of attaching portions 25 which are located in a rear portion of the frame 22 in various points in the rear surface of the frame 22 to allow attaching the frame 22 in a side of the trailer/vehicle or the vehicle. The attaching portions 25 may have a circular body and may be made of a magnetic material. It is to be considered that attaching portions 25 may be made of a ferromagnetic metal which allows the frame 22 to interlock a surface which most of the trailer or vehicles include. In a preferred embodiment, the attaching portion and the attachment member 26 may be configured to attach the frame 22 to the lateral side of the trailer/vehicle or any vehicle exterior sides. In a preferred embodiment, the attachment member 26 and the attaching portions 25 may be configured to attach the frame 22 to any trailer/vehicle considering different variations which may modify shape thereof according to the type of vehicle/trailer the frame 22 is being attached to. The attachment member 26 may be configured to be customized for any vehicle/trailer which may modify the different embodiments regarding the shapes thereof.

Figure 2:
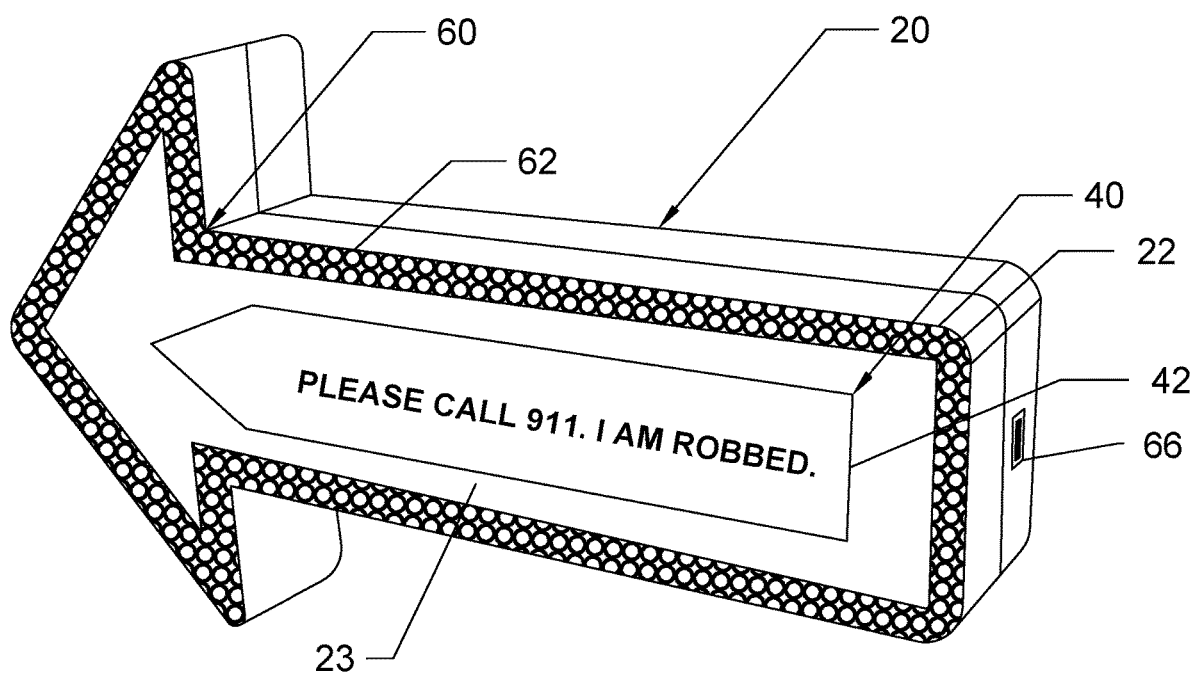
FIG. 2 shows an isometrical view of the frame assembly 20 and the electric assembly 60 with a display 46 showing a message 46*a*.
Figure 3:
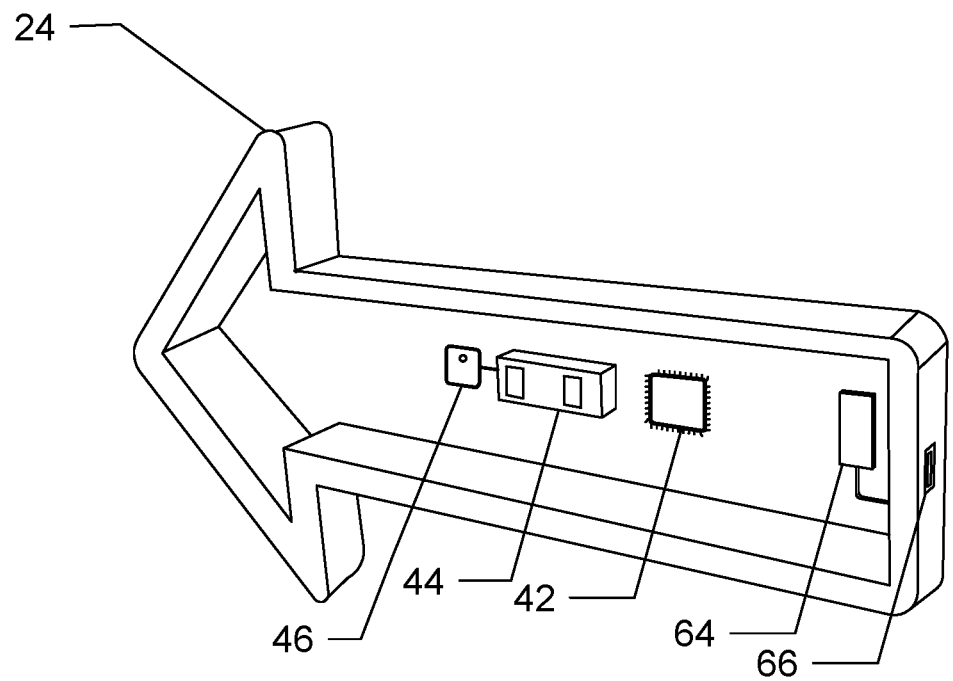
FIG. 3 illustrates an internal isometrical view of the electronic system assembly 40 and internal view of the electric system 42 showing a GPS unit 44.
Figure 4:
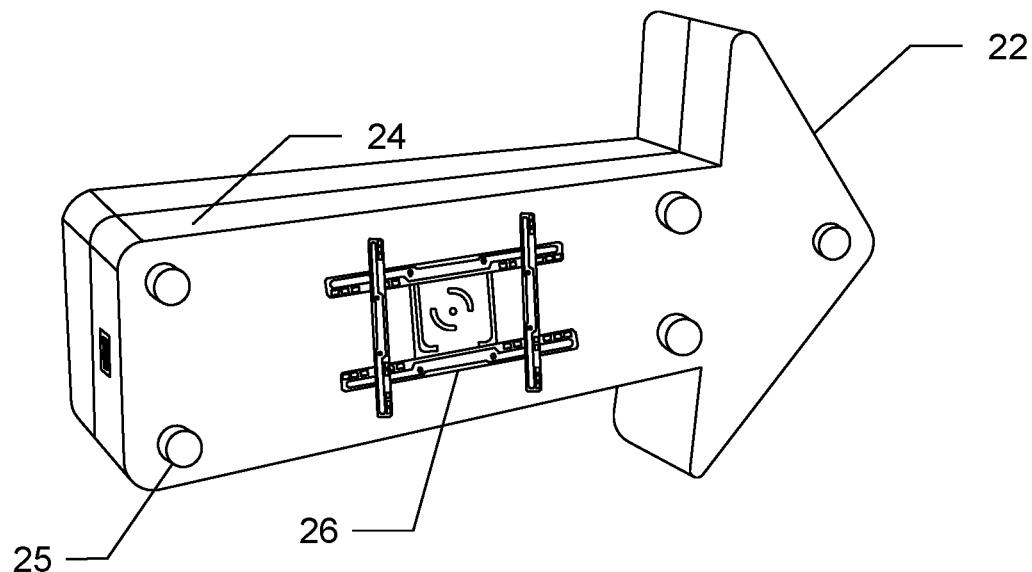
FIG. 4 is a representation of an isometrical view of the back portion 24 which shows an attaching portion 25 and an attachment adapter 26.
Figure 5:
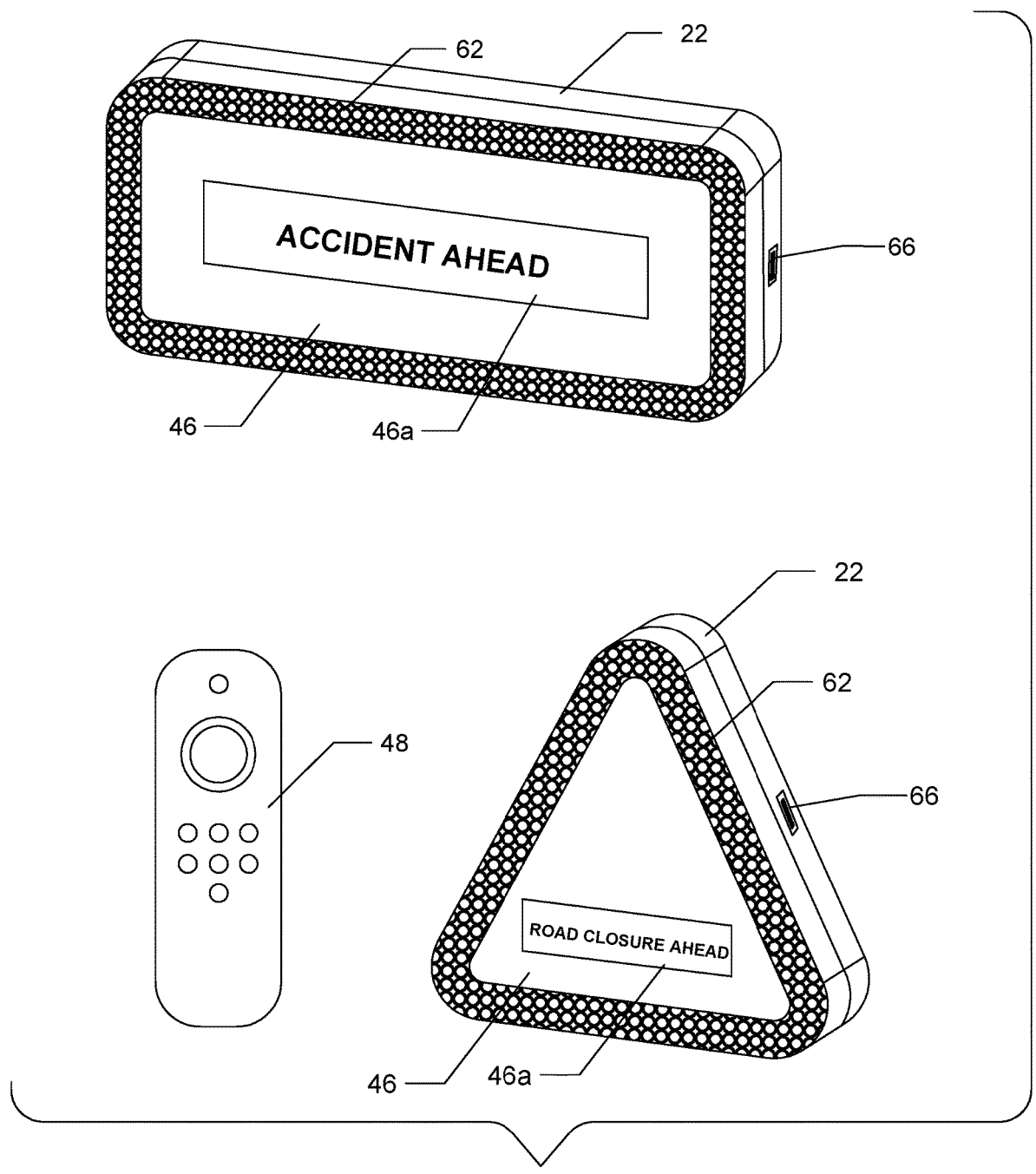
FIG. 5 illustrates isometrical views of the frames 22 and the remote 48 of an embodiment of the invention.

The electronic system assembly 40 includes an electronic system 42, a GPS unit 44, a display 46, messages 46a and a remote device 48. The frame 22 is dimensioned to receive the electronic system 42, the remote device 28 and the electric system 42. In a preferred embodiment the electronic system 62 may be a microcontroller which allow to operate the GPS unit 44, the display 46. The electric system 62 may be attached to the hollow body of the back portion 24 as shown in FIG. 3 the GPS unit 44 is related to the electronic system 44 and the electric system 60. In a suitable embodiment, the electronic system 42 may pass through the front portion 23 to show the display 45 when activating the frame 22 by the remote device 28. The electronic system 42 may activate the GPS unit 44 to allow the frame to be traceable. It is to be considered that the display 46 may have a shape that conforms with the shape of the frame 22 as best shown in FIG. 2. It is to be considered that the electronic system 62 may be configured to display different colors that show different signals. In one embodiment, the display 64 may show the messages 64a with red/white lights to prevent warnings, emergencies, or medical alerts. In another embodiment, the display 64 may show the messages 64a with a green light for general expressions, greetings/alerts or any variation thereof. In another embodiment, the display 64 may show the messages 64a with an amber light for roadside assistance requests, weather, traffic condition, forecast and alerts.

In a suitable embodiment the electronic system 42 may be controlled by the remote device 48 which may be controlled by voice to provide the display of messages over the frame 22. In one embodiment, the electronic system 42 may be suitable to be controlled by an external device. In another embodiment, the frame 22 may include the electronic system 42 which may be wired in the inner thereof. It is to be considered that electronic system 42 may be configured to cooperate with the electric system assembly 60 to properly function. It may be suitable for display 46 to show the messages with a different type of messages. The messages 46a may be configured to prevent any accident by providing signal to other vehicles. In a suitable embodiment, the messages 46a may show warning messages, emergency messages, assistance messages, expression messages, informative messages, or any other variation thereof.

The electric system assembly 60 includes an electric system 62, a light cord, a 63 a battery 64 and inputs 66. The electric system 62 may be suitable to be related to the electronic system 42 by the light cord 63. In a suitable embodiment, the electric system 62 may include a battery 64 which may be configured to power the electronic system 42. It is to be considered that the battery 64 may be related to the input 66 which is placed in a distal end of the back portion 24 to allow the electronic system 42 to be charged. In one embodiment, the battery 64 may be a rechargeable battery. In another embodiment, the battery 64 may be required to be plugged in by the light cord 63. It is to be considered that the frame 22 may be required to be charged when collocating on the trailer/vehicle 29. The frame 22 may provide signal messages to avoid/prevent accidents or in any situation needed.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

I claim:

1. A driver courtesy, consisting of:
   a frame assembly including a frame, said frame is configured to be attached to an exterior of a trailer/vehicle to shown signal messages by an attachment adapter, said attachment adapter interlocks a rear surface of said frame, said frame is assembled by a front portion and a back portion, said back portion has a hollow body, said front portion in configured to be exposed to an exterior of a vehicle, said back portion is configured to be attached to an exterior surface of the vehicle said frame made out of a steel material with natural rubber, said frame is customizable to have any shape including an electronic system assembly and said electric system assembly, said attachment adapter is adjustable and customizable to allow said frame to be attached to any trailer/vehicle in different sides thereof;
   said electronic system assembly including an electronic system stored in said back portion, said electronic assembly includes a GPS to allow said frame to be traceable, said electronic system related to a display to shown signal messages with different signal related to colors shown on display, said electronic system being a microcontroller, said messages are configured to show a red/white light for warnings, emergencies or medical alerts, said messages are configured to show a green light for general expressions, greetings/alerts, said messages are configured to show an amber light for roadside assistance requests, weather, traffic condition, forecast and alerts, said display activated by remote control by voice to allow show said message; and
   an electric system assembly including an electric system, said electric system configured to provide energy to said electronic assembly by a battery, said battery attached proximal to said electronic system, said battery connected to an input, said input attached to a distal end of said back portion, said input allowing to recharge said battery, said electric system related with said electronic system within said frame.

* * * * *